United States Patent
He et al.

(10) Patent No.: US 11,914,936 B2
(45) Date of Patent: Feb. 27, 2024

(54) METHOD AND SYSTEM FOR PREDICTING GAS CONTENT IN TRANSFORMER OIL BASED ON JOINT MODEL

(71) Applicant: WUHAN UNIVERSITY, Hubei (CN)

(72) Inventors: Yigang He, Hubei (CN); Wenjie Wu, Hubei (CN); Hui Zhang, Hubei (CN); Chaolong Zhang, Hubei (CN); Liulu He, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 18 days.

(21) Appl. No.: 17/160,412

(22) Filed: Jan. 28, 2021

(65) Prior Publication Data

US 2021/0350050 A1    Nov. 11, 2021

(30) Foreign Application Priority Data

May 6, 2020 (CN) .......................... 202010372630.7

(51) Int. Cl.
*G06F 30/27* (2020.01)
*G06F 17/18* (2006.01)
(Continued)

(52) U.S. Cl.
CPC .............. *G06F 30/27* (2020.01); *G06F 17/18* (2013.01); *G06N 3/08* (2013.01); *G06F 2119/22* (2020.01)

(58) Field of Classification Search
CPC ...... G06F 2119/22; G06F 17/18; G06F 30/27; G06N 3/08
See application file for complete search history.

(56) References Cited

U.S. PATENT DOCUMENTS

| 2012/0317058 A1* | 12/2012 | Abhulimen | ............ G06N 20/00 706/2 |
| 2021/0010893 A1* | 1/2021 | Jiang | ...................... G01M 3/243 |

FOREIGN PATENT DOCUMENTS

| CN | 106055888 B | * | 9/2018 | ............. G06F 19/00 |
| CN | 108663501 A | * | 10/2018 | |

OTHER PUBLICATIONS

Huang, CN-106055888-B, 2016, downloaded from the Internet on Jun. 3, 2022 (Year: 2016).*

(Continued)

*Primary Examiner* — Mohamed Charioui
*Assistant Examiner* — Lyudmila Zaykova-Feldman
(74) *Attorney, Agent, or Firm* — JCIPRNET (57) ABSTRACT

A method and a system for predicting a gas content in transformer oil based on a joint model are provided and belong a field of transformer failure prediction. The method includes the following: determining a type and a time series of gas to be predicted related to a failure, processing an original series by adopting empirical mode decomposition (EMD) and local mean decomposition (LMD) for a non-stationarity characteristic of a dissolved gas concentration series in oil; performing normalization on each sub-series component, dividing a training sample and a test sample; and establishing a deep belief network (DBN) prediction model for each of the sub-series components for training, performing superposition and reconstruction on the established DBN prediction model to perform characteristic extraction and classification on multi-dimensional data of the failure, evaluating prediction performance of the prediction model through calculating an error index.

17 Claims, 3 Drawing Sheets

(51) Int. Cl.
*G06N 3/08* (2023.01)
*G06F 119/22* (2020.01)

(56) References Cited

OTHER PUBLICATIONS

Chen, CN-108663501-A,, 2017, downloaded from the Internet on Jun. 3, 2022 (Year: 2017).*
Chen, CN-108663501-A, 2017, English Translation downloaded from the Espacenet on Jun. 3, 2022 (Year: 2017).*
Chen, CN-108663501-A, 2017, English Translation downloaded from the Espacenet on Jun. 3, 2022 (Year:2017) (Year: 2017).*

* cited by examiner

METHOD AND SYSTEM FOR PREDICTING GAS CONTENT IN TRANSFORMER OIL BASED ON JOINT MODEL

CROSS-REFERENCE TO RELATED APPLICATION

This application claims the priority benefit of China application serial no. 202010372630.7, filed on May 6, 2020. The entirety of the above-mentioned patent application is hereby incorporated by reference herein and made a part of this specification.

BACKGROUND

Technical Field

The disclosure relates to a field of transformer failure prediction, and in particular, relates to a method and a system for predicting a gas content in transformer oil based on a joint model.

Description of Related Art

The safe operation of power equipment is the basis for the safe and stable operation of a power grid, especially the key hub equipment of the power system. The safe and stable operation of power transformers is related to the power supply for the normal operation of society. At present, the failure diagnosis for power transformers is mainly divided into offline monitoring and online monitoring. The dissolved gas analysis in oil is an important online measurement method for transformers. The prediction of the dissolved gas concentration in oil may act as an important prediction basis for power transformer failure diagnosis and early warning and is still recognized as an effective method to find defects and latent failures in power transformers at present. The value of the gas component content in oil is obtained according to the fixed sampling cycle through an oil chromatography online monitoring device, and an oil chromatography online monitoring time series is formed. The development trend of the dissolved gas concentration in oil may be accurately predicted by using the historical monitoring sequence, which has an important technical value for the early warning of power transformer failures.

The conventional prediction method is mainly limited by the data distribution law of the sequence itself and is limited by the specific prediction sequence. Other significant limitations are provided in other application scenarios. With the continuous development of the artificial intelligence technology, increasing intelligent prediction methods may be used to perform analysis and training by using a large amount of historical data to obtain prediction models that may reflect the development trend of the time series. The conventional artificial intelligence method may not be used to effectively capture the time series correlation of sequence data, so it provides only limited prediction accuracy for the oil chromatographic online monitoring sequence.

At present, prediction methods weighting and combining multiple single methods are also provided. Nevertheless, in these methods, the weight of a combined model is determined based on expert experience, so that determination of the weight may be subjective, or the weight may be a negative value.

SUMMARY

In view of the above defects or improvement requirements of the related art, the disclosure provides a method and a system for predicting a gas concentration in power transformer oil based on a joint model through which a dissolved gas concentration time series in power transformer oil is decomposed into components exhibiting strong stationarity and regularity. A deep belief network (DBN) is then used for multi-layer network characteristic extraction, prediction may thus be performed on a state of a transformer, and a failure may therefore be identified in a timely manner. In this way, the technical problems of limitation found in single diagnosis methods, subjective determination of weights as affected by expert experience, negative weighting values, and so on may be accordingly solved.

To realize the above purpose, according to one aspect of the disclosure, a method for predicting a gas content in transformer oil based on a joint model is provided, and the method includes the following steps.

(1) An original concentration time series of gas to be predicted related to a failure is obtained.

(2) Empirical mode decomposition (EMD) is performed on the original concentration time series to obtain a plurality of intrinsic mode function (IMF) components and 1 remaining component, and local mean decomposition (LMD) is performed on the original concentration time series to obtain a plurality of product function (PF) components and 1 residual component.

(3) A DBN is applied on each one of the IMF components and the remaining component and each one of the PF components and the residual component to obtain a concentration prediction result of a single component of a next moment.

(4) Linear superposition and reconstruction are performed on concentration prediction results of a same moment of each of the IMF components and the remaining component to obtain an EMD single-step prediction value, the linear superposition and reconstruction are performed on prediction results of a same moment of each of the PF components and the residual component to obtain a LMD single-step prediction value.

(5) Multi-step extended prediction is performed on the EMD single-step prediction value and the LMD single-step prediction value to obtain a concentration prediction value of the original concentration time series of a plurality of subsequent moments.

Preferably, the step of performing the EMD on the original concentration time series to obtain the IMF components and 1 remaining component in step (2) includes the following steps.

(a) All maximum points and all minimum points are both obtained in the original concentration time series, an upper envelope of all of the maximum points and a lower envelope of all of the minimum points are obtained, and an envelope mean value of the upper envelope and the lower envelope is obtained.

(b) A difference value between the original concentration time series and the envelope mean value is obtained.

(c) Whether the difference value satisfies an IMF constraint condition is determined. The difference value is treated as a new input time series if no is determined, and step (a) and step (b) are performed until a finally obtained target difference value satisfies the constraint condition. The target difference value is treated as a first IMF component, the target difference value is separated from the original concentration time series, and a remaining component is obtained.

(d) The remaining component is treated as a new original concentration time series, step (a) to step (c) are repeatedly performed, and the rest of the IMF components and 1 final target remaining component are obtained.

Preferably, the step of performing the LMD on the original concentration time series to obtain the PF components and 1 residual component in step (2) includes the following steps.

(i) All local extremum points of the original concentration time series are obtained, an mean value of adjacent local extremum points is sequentially calculated, and a local mean function of the mean values is obtained.

(ii) An envelope estimate of adjacent local extremum points is calculated, and adjacent 2 envelop estimated values are sequentially smoothed to obtain an envelope estimation function.

(iii) The local mean function is separated from the original concentration time series to obtain a difference function.

(iv) The difference function is divided by the envelope estimation function to obtain a division value function, the division function is treated as the new input time series, and step (i) to step (iii) are repeatedly performed until a finally-obtained target division value function is 1 pure frequency modulation signal.

(v) All envelope estimation functions obtained in an iterative process are multiplied to obtain an envelop signal.

(vi) The pure frequency modulation signal and the envelop signal are multiplied to obtain a $1^{st}$ PF component of the original concentration time series:

(vii) The $1^{st}$ PF component is separated from the original concentration time series to obtain a residual component, the residual component is treated as the new original concentration time series, step (i) to step (vii) are repeatedly performed until a finally-obtained target residual component is a monotonic function, and the rest of the PF components and a final target residual component are obtained.

Preferably, before step (3), the method further includes the following.

Each one of the IMF components and the remaining component and each one of the PF components and the residual component are normalized to a range of [0,1].

Preferably, step (5) includes the following steps.

(5.1) The multi-step extended prediction is performed on the EMD single-step prediction value and the LMD single-step prediction value by using the trained deep belief network. The linear superposition and reconstruction are performed on a multi-step prediction result of a same moment of the EMD to obtain an EMD-DBN multi-step prediction value. The linear superposition and reconstruction are performed on a multi-step prediction result of a same moment of the LMD to obtain an LMD-DBN multi-step prediction value.

(5.2) A mean value of the EMD-DBN multi-step prediction value and the LMD-DBN multi-step prediction value is obtaining and treat as the concentration prediction value of the original concentration time series of a plurality of subsequent moments.

Preferably, the method further includes the following steps.

The prediction result is evaluated by using a root mean square error and an error standard deviation.

Preferably, the gas to be predicted related to the failure includes: hydrogen, methane, ethane, ethylene, or acetylene.

According to another aspect of the disclosure, a system for predicting a gas content in transformer oil based on a joint model is provided, and the system includes a data acquisition module, a sub-series decomposition module, a single component prediction module, a superposition and reconstruction module, and a prediction result determination module.

The data acquisition module is configured to obtain an original concentration time series of gas to be predicted related to a failure.

The sub-series decomposition module is configured to perform empirical mode decomposition (EMD) on the original concentration time series to obtain a plurality of intrinsic mode function (IMF) components and a remaining component and perform local mean decomposition (LMD) on the original concentration time series to obtain a plurality of product function (PF) components and 1 residual component.

The single component prediction module is configured to apply a deep belief network (DBN) on each one of the IMF components and the remaining component and each one of the PF components and the residual component to obtain a concentration prediction result of a next moment.

The superposition and reconstruction module is configured to perform linear superposition and reconstruction on concentration prediction results of a same moment of each of the IMF components and the remaining component to obtain an EMD single-step prediction value and perform the linear superposition and reconstruction on prediction results of a same moment of each of the PF components and the residual component to obtain a LMD single-step prediction value.

The prediction result determination module is configured to perform multi-step extended prediction on the EMD single-step prediction value and the LMD single-step prediction value to obtain a concentration prediction value of the original concentration time series of a plurality of subsequent moments.

According to another aspect of the disclosure, a computer readable storage medium storing a computer program is provided. The computer program implements any step of the method for predicting the gas content in the transformer oil based on the joint model when being processed by a processor.

In general, the above technical solutions provided by the disclosure have the following beneficial effects compared with the related art.

1. Regarding the nonlinear and non-stationary characteristics of the time series of the dissolved gas concentration in transformer oil, in the disclosure, different scales/trend components are decomposed from the dissolved gas concentration time series in oil step by step through the EMD and the LMD. A series of sub-series components with different time scales are thereby formed and exhibit improved stationarity and regularity compared to an original series, and enhanced prediction accuracy is therefore provided.

2. Due to the difference in operation mechanisms, the number of iterations of the LMD is less than that of the EMD, such that the end effect is suppressed to a certain extent, and the problems of under- and over-envelope are solved on the other hand. The EMD has the advantage of adaptive decomposition, and the amount of calculation is relatively small.

Therefore, the LMD and EMD are combined to decompose the original time series, and prediction errors may thus be reduced.

3. The components are trained after being decomposed through the EMD and LMD by using the DBN in deep learning. Therefore, the prediction method provided by the disclosure is based on the machine learning technology and may better utilize the existing database to maximize prediction performance. In the disclosure, the state of a transformer is monitored, and occurrence of a failure is identified in time.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

To better illustrate the goal, technical solutions, and advantages of the disclosure, the following embodiments accompanied with drawings are provided so that the disclosure are further described in detail. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

The changing process of the dissolved gas content in transformer oil may fluctuate, and the gas content may be affected by factors such as the oil temperature, the gas partial pressure of the oil, the essence of a failure, and the speed of development. The time series of the gas concentration has certain nonlinear and non-stationary characteristics. In view of the above, the disclosure therefore provides a method for predicting a gas content in transformer oil based on a joint model through which an original series is decomposed through pre-processing, stationarity and regularity of the oil chromatographic online monitoring series are enhanced, a model for each sub-series component is separately built, a prediction result is superposed and reconstructed, and a combined prediction result satisfying accuracy requirements is obtained.

Figure 1:
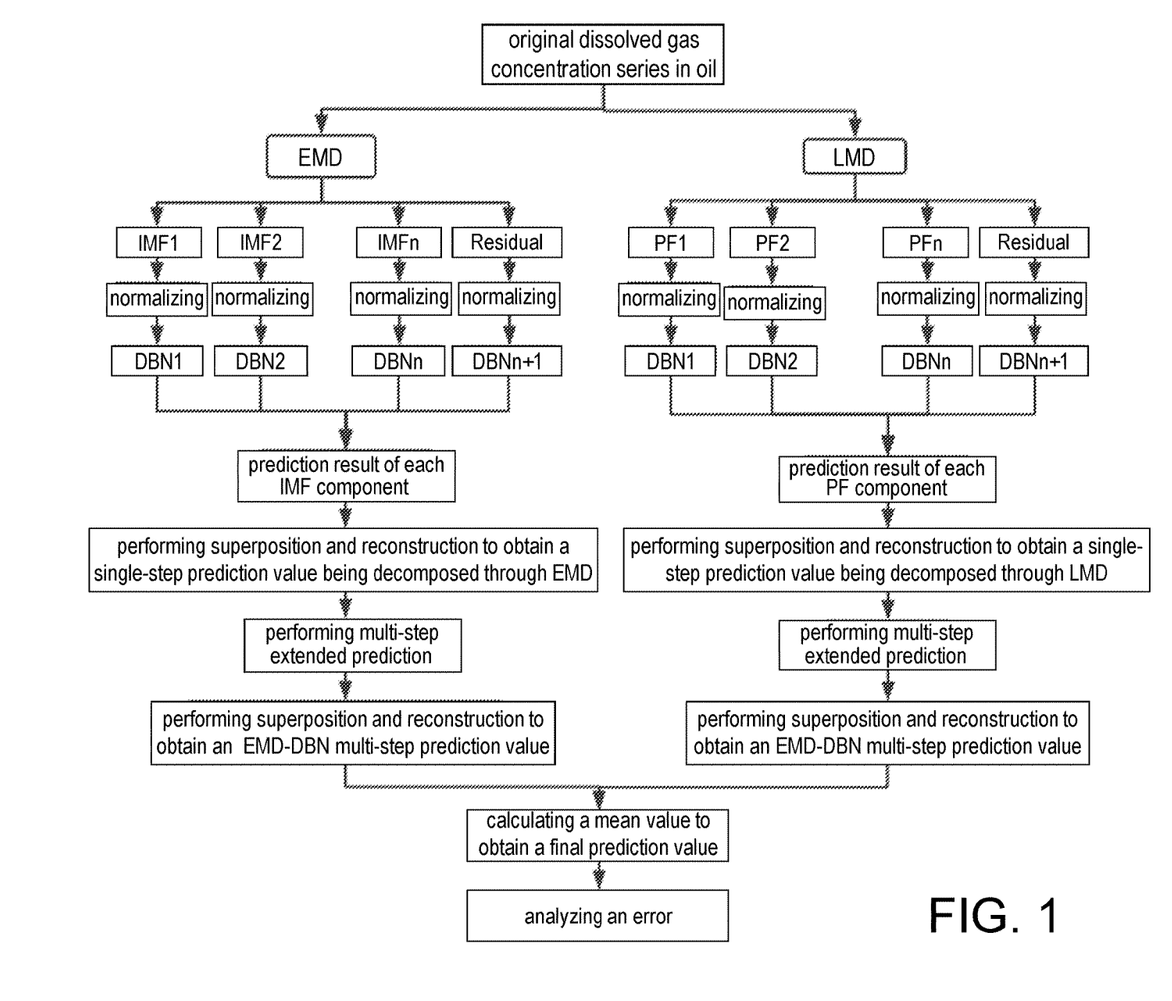
FIG. 1 is a schematic flow chart of a method according to an embodiment of the disclosure.

As shown in FIG. 1, a schematic flow chart of a method for predicting a gas content in transformer oil based on an empirical mode decomposition-local mean decomposition-deep belief network (EMD-LMD-DBN) joint model according to an embodiment of the disclosure, and the method includes the following steps.

(1) A type of gas to be predicted and a concentration time series are determined.

According to GB/T7252-2001 "Guide to the analysis and the diagnosis of gases dissolved in transformer oil", a failure may be determined and analyzed by analyzing the contents of 7 gases ($H_2$, $C_2H_2$, $C_2H_4$, $C_2H_6$, $CH_4$, CO and $CO_2$) in the oil. A transformer may slowly produce CO and $CO_2$ during the natural aging process of normal operation. When the failure involves solid insulation, such failure may increase considerably. Further, the failure is comprehensively related to factors such as the structural characteristics, operating temperature, load condition, and operating history of the transformer. Therefore, in the embodiments of the disclosure, when overheating and discharge failures are studied, the failure of solid insulation materials is not taken into consideration. Five failure characteristic gases of hydrogen, methane, ethane, ethylene, and acetylene are selected as characteristic variables.

(2) EMD is performed on an original concentration time series to obtain a plurality of intrinsic mode function (IMF) components and 1 remaining component.

The essence of EMD is to decompose an original gas concentration time series x(t) into superposition of fluctuations on different characteristic scales. Specific steps for EMD of the original gas concentration time series x(t) are provided as follows.

(2.1) All maximum points and all maximum points in the original gas concentration time series x(t) are identified. An upper envelope $x_{up}(t)$ of the maximum points and a lower envelope $x_{low}(t)$ of the minimum points are fitted by adopting a cubic spline interpolation, and an envelope mean value m(t) of the upper envelope and the lower envelope are calculated:

$$m(t)=[(t)+x_{up}(t)+x_{low}(t)]/2$$

(2.2) A difference value between the original gas concentration time series x(t) and the envelope mean value m(t) are calculated and marked as h(t):

$$h(t)=x(t)-m(t)$$

(2.3) Determining whether h(t) satisfies an IMF constraint condition—an average curve approaches 0. If no is determined, h(t) is treated as a new input series, and step (2.1) and step (2.2) are repeatedly performed until the constraint condition is satisfied. If yes is determined, h(t) is treated as a first IMF component and is marked as $c_1(t)=h(t)$. Further, $c_1(t)$ is separated from the original gas concentration time series x(t), and a remaining component $r_1(t)$ is obtained:

$$r(t)=x(t)-c_1(t)$$

(2.4) The remaining component r1(t) is treated as a new original gas concentration time series. The foregoing stationary processing step (2.1) to step (2.3) are repeatedly performed until $r_n(t)$ includes only one extremum point or is turned into a monotonic function, and the rest of the IMF components and 1 remaining component may be obtained. What remains at this time is a residue $r_n$. The final result of EMD may be represented as:

$$x(t) = \sum_{i=1}^{n} c_i(t) + r_n$$

where $c_i(t)$ represents an $i^{th}$ intrinsic mode function component, $r_n$ represents a remaining component of a trend component of the original gas concentration time series.

(3) LMD decomposition is performed on the original concentration time series to obtain a plurality of product function (PF) components and 1 residual component.

The essence of the LMD decomposition is to decompose the original gas concentration time series x(t) into pure frequency modulation signal and an envelope signal. The two are multiplied and iterated to separate a series of PF components. Specific steps for EMD of the original gas concentration time series x(t) are provided as follows.

(3.1) All local extremum points $n_i$ of the original gas concentration time series x(t) are found, and an mean value $m_i$ of adjacent extremum points is sequentially calculated. All of the mean values are smoothed by using a moving average method to obtain a local mean function $m_{11}$ (t):

$$m_i = \frac{n_i + n_{i+1}}{2}$$

(3.2) An envelope estimate $a_i$ of adjacent local extremum points are sequentially calculated, and adjacent 2 envelop estimated values are sequentially smoothed by using the moving average method to obtain an envelope estimation function $a_{11}(t)$:

$$a_i = \frac{|n_i - n_{i+1}|}{2}$$

(3.3) A difference function $h_{11}(t)$ of the local mean function $m_{11}(t)$ is separated from the original gas concentration time series x(t):

$$h_{11}(t) = x(t) - m_{11}(t)$$

(3.4) $h_{11}(t)$ is demodulated, and $h_{11}(t)$ is divided by the envelope estimation function $a_{11}(t)$ to obtain $s_{11}(t)$. $s_{11}(t)$ is treated as a new input time series, and (3.1) to (3.3) are iteratively performed until the finally-obtained $s_{1n}(t)$ is 1 pure frequency modulation signal. That is, an envelope estimation function of $s_{1n}(t)$ is $a_{1n}$, (t)=1:

$$s_{11}(t) = \frac{h_{11}(t)}{a_{11}(t)}$$

(3.5) All envelope estimation functions obtained in an iterative process are multiplied to obtain an envelop signal (an instantaneous amplitude function) $a_1$ (t):

$$a_1(t) = \prod_{i=1}^{n} a_{1i}(t).$$

(3.6) The pure frequency modulation signal $s_{1n}(t)$ is multiplied by the envelop signal $a_1$ (t), and a $1^{st}$ PF component of the original gas concentration time series x(t) is obtained:

$$PF_1(t) = a_i(t)s_{1n}(t)$$

An instantaneous amplitude value thereof is the envelop signal $a_1(t)$, and an instantaneous frequency $f_1(t)$ may be calculated through the pure frequency modulation signal $s_{1n}$ (t):

$$f_1(t) = \frac{1}{2\pi} \frac{d[\arccos(s_{1n}(t))]}{dt}$$

(3.7) The $1^{st}$ PF component $PF_1(t)$ is separated from the original gas concentration time series x(t), and 1 new signal $u_1(t)$ is obtained. $u_1(t)$ is treated as a new original concentration time series, the foregoing process is repeated for 3.1 to 3.7 k times until $u_k(t)$ is turned into a monotonic function:

$$\begin{cases} u_1(t) = x(t) - PF_1(t) \\ u_2(t) = u_1(t) - PF_2(t) \\ \vdots \\ u_k(t) = u_{k-1}(t) - PF_k(t) \end{cases}$$

The final result of LMD may be represented as:

$$x(t) = \sum_{i=1}^{k} PF_i(t) + u_k(t)$$

(4) A DBN prediction model is established for each of the sub-series components for predicting.

The principle of modeling is to use a known time series to predict the gas content at the next time point. Input is the gas content at the previous m time point, and output is the gas content at the next time point. That is, the gas content x(t) at time t is:

$$X(t) = f(X(t-1), X(t-2), \ldots, X(t-m))$$

It is assumed that y(1), y(2), . . . , and y(n) is a component series after the original gas concentration time series x(t) is decomposed by EMD or LMD, and a DBN input/output structure is provided as follows:

$$X = \begin{pmatrix} y(1) & y(2) & \ldots & y(m) \\ y(2) & y(3) & \ldots & y(m+1) \\ \vdots & \vdots & \ddots & \vdots \\ y(n) & y(n+1) & \ldots & y(n+m-1) \end{pmatrix}, Y = \begin{pmatrix} y(m+1) \\ y(m+2) \\ \vdots \\ y(n+m) \end{pmatrix}$$

Superposition and reconstruction are performed on a single-step prediction result of each of the sub-series components, multi-step extended prediction is performed by using the trained prediction model, and specific steps are provided as follows.

(4.1) Each of the IMF components and each of the PF components are pre-processed, such that data processing efficiency of a subsequent deep learning model may be enhanced, and data is normalized within a range of [0,1]:

$$x' = \frac{x - x_{min}}{x_{max} - x_{min}}$$

where x' and x respectively are values of each of the sub-series components after and before being normalized, and $x_{max}$ and $x_{min}$ respectively are a maximum value and a minimum value of data in each of the sub-series components.

(4.2) The foregoing input/output structure is adopted, DBN modeling is performed on each of the normalized components, and the prediction result of each of the components of the next moment is obtained. Linear superposition and reconstruction are performed on the prediction results of EMD and LMD of each of the components at the same time, and a single-step prediction value of dissolved gas concentration in oil at that time is obtained.

Figure 2:
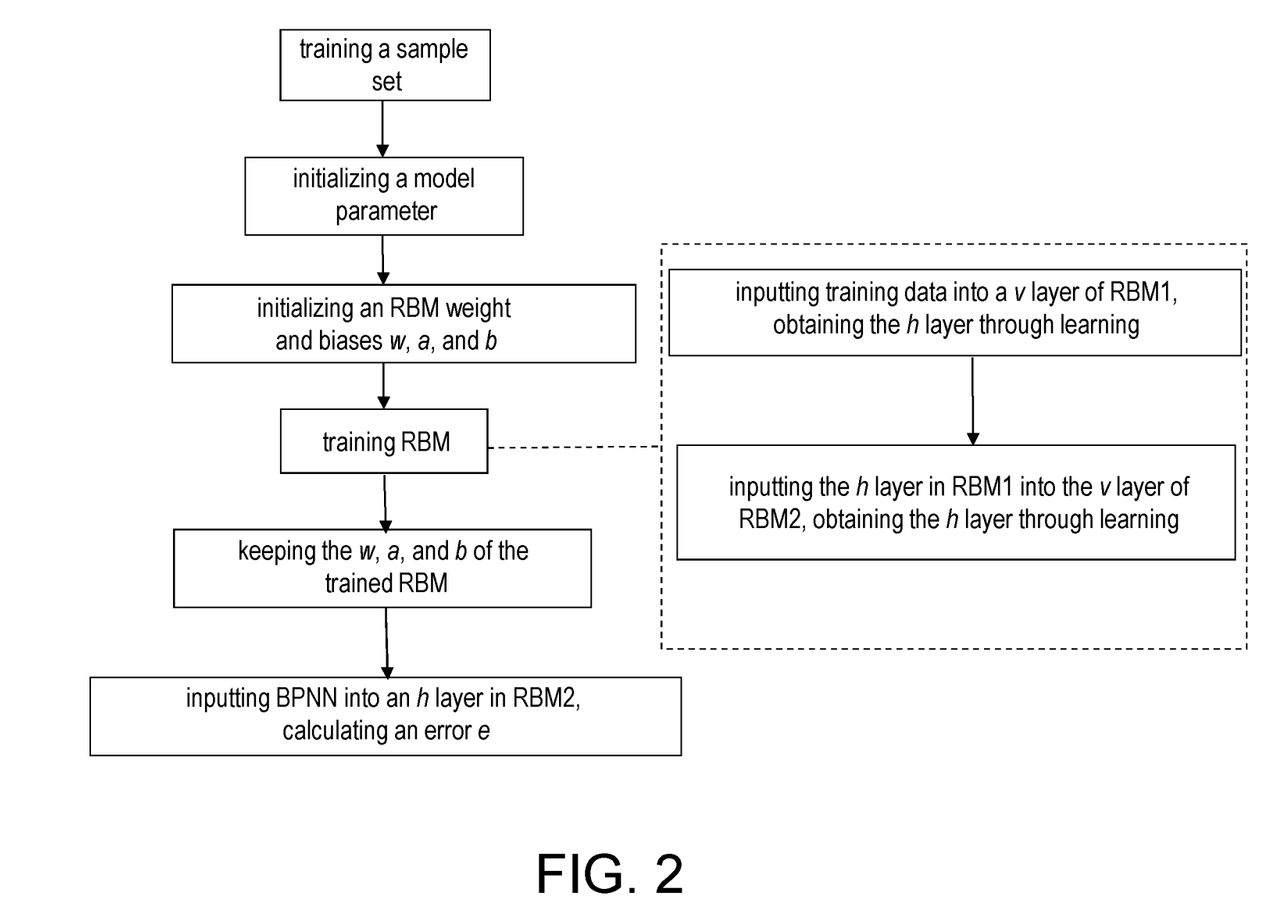
FIG. 2 is a schematic flow chart of a DBN training process according to an embodiment of the disclosure.

The training process of DBN includes two parts: pre-training and tuning. Pre-training essentially uses a layer-by-layer unsupervised feature optimization algorithm to initialize a parameter of a bias value of each layer of neurons and connection weights between layers. After the parameter is initialized, the parameter is required to be updated, and a loop is continuously iterated until a reconstruction error meets a requirement. Each restricted Boltzmann machine (RBM) has a visible layer v and a hidden layer h. Units on the same layer are not connected, and different layers are fully connected. If a number of visible units in the layer v is n and a number of hidden units in the layer h is m, then energy of one RBM may be defined as:

$$E(v, h | \theta) = -\sum_{i=1}^{n} a_i v_i - \sum_{j=1}^{m} b_j h_j - \sum_{i=1}^{n} \sum_{j=1}^{m} v_i W_{ij} h_j$$

In the formula, $v_i$ represents a state of an $i^{th}$ visible unit, and $h_j$ represents a state of a $j^{th}$ hidden unit. The parameter of RBM is $\theta=\{w_{ij}, a_i, b_j\}$, w represents a connection weight between the visible unit i and the hidden unit j, $a_i$ represents a bias of the visible unit i, and $b_j$ represents a bias of the hidden unit j. Based on an energy function, a joint probability distribution of (v,h) may be obtained:

$$P(v, h | \theta) = \frac{e^{-E(v,h|\theta)}}{Z(\theta)}$$

In the formula, $Z(\theta)=\Sigma_{v,h}e^{-E(v,h|\theta)}$ is a normalization factor, that is, a partition function.

Learning of RBM is to find the value of parameter $\theta=\{w,a,b\}$ to fit the training data. A maximum likelihood method may be used for specific operations. A likelihood function is $L(\theta|v)=\Pi_v p(v)$, which is transformed into a logarithmic form and is further derived and obtained. Finally, it may be solved iteratively by a contrastive divergence (CD) algorithm.

The tuning process after pre-training is a supervised learning process. Supervision means that in the process of learning label data, parameters of a model are constantly revised backwards to optimize the training effect of the model. The specific operation is to use a backpropagation (BP) algorithm to reversely fine-tune the parameters of each RBM in turn to obtain a complete DBN training model. The entire DBN training process is shown in FIG. 2, and 2 hidden layers are used to serve as an example in FIG. 2.

(4.3) The multi-step extended prediction is performed on the EMD single-step prediction value obtained through superposition and reconstruction and the LMD single-step prediction value obtained through superposition and reconstruction by using the trained DBN model. Linear superposition and reconstruction are performed on the multi-step prediction results of EMD and LMD at the same time, and the multi-step prediction values of EMD-DBN and LMD-DBN of the dissolved gas concentration in oil at that time are obtained.

In the embodiments of the disclosure, the multi-step extended prediction refers to adding of a value of a time node of each single-step prediction obtained through superposition and reconstruction to a historical time series for prediction again.

(4.4) The mean value of the EMD-DBN multi-step prediction value and the LMD-DBN multi-step prediction value is solved, and the mean value is treated as a prediction value of the dissolved gas in the transformer oil of a subsequent moment.

(5) The prediction result is evaluated by using a root mean square error (RMSE) and an error standard deviation (SD):

$$RMSE = \sqrt{\frac{\sum_{i=1}^{n}(\hat{x}(t)-x(t))^2}{n}}, SD = \sqrt{\frac{\sum_{i=1}^{n}(x_i-\bar{x})^2}{n}}$$

Herein, $\hat{x}(t)$ is a prediction value, $x(t)$ is a true value, n is a number of time nodes, $x_i$ is a difference between the prediction value and the true value, and $\bar{x}$ an average error value.

Figure 3:
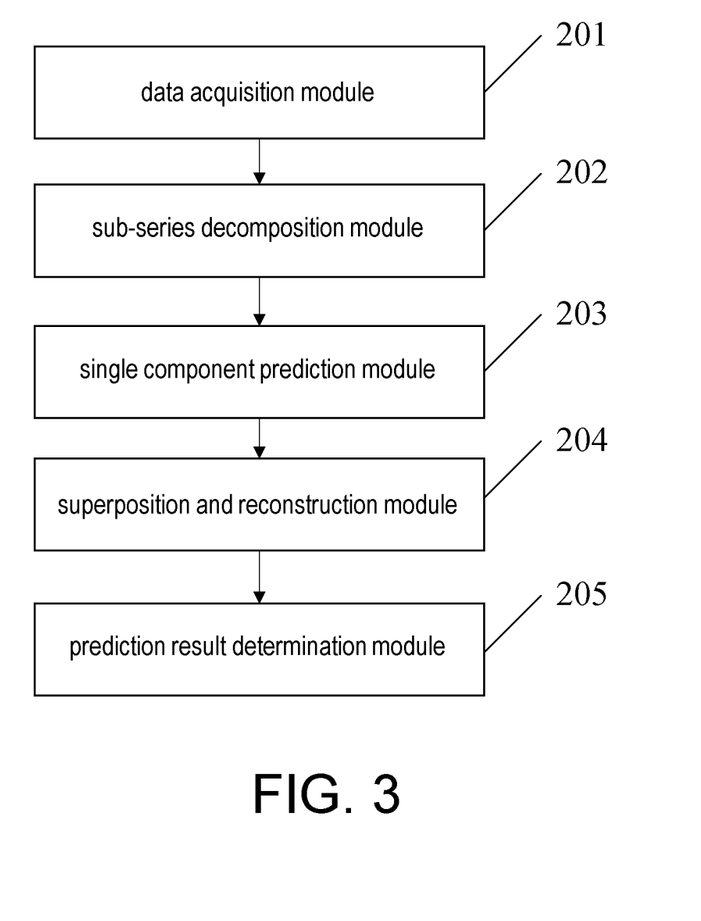
FIG. 3 is a schematic diagram of a structure of a system according to an embodiment of the disclosure.

As shown in FIG. 3, in another embodiment of the disclosure, a system for predicting a gas content in transformer oil based on a joint model is further provided, and the system includes a data acquisition module 201, a sub-series decomposition module 202, a single component prediction module 203, a superposition and reconstruction module 204, and a prediction result determination module 205.

The data acquisition module 201 is configured to obtain an original concentration time series of gas to be predicted related to a failure.

The sub-series decomposition module 202 is configured to perform EMD on the original concentration time series to obtain a plurality of IMF components and 1 remaining component and perform LMD on the original concentration time series to obtain a plurality of PF components and 1 residual component.

The single component prediction module 203 is configured to apply a DBN on each one of the IMF components and the remaining component and each one of the PF components and the residual component to obtain a concentration prediction result of a next moment.

The superposition and reconstruction module 204 is configured to perform linear superposition and reconstruction on concentration prediction results of a same moment of each of the IMF components and the remaining component to obtain an EMD single-step prediction value and perform the linear superposition and reconstruction on prediction results of each of the PF components and the residual component to obtain a LMD single-step prediction value.

The prediction result determination module 205 is configured to perform multi-step extended prediction on the EMD single-step prediction value and the LMD single-step prediction value to obtain a concentration prediction value of the original concentration time series of a plurality of subsequent moments.

Herein, specific implementation of each of the modules may be found with reference to the description provided above, and description thereof is not repeated in the embodiments of the disclosure.

According to another embodiment of the disclosure, a computer readable storage medium is further provided. The computer readable storage medium stores a computer program, and the computer program implements the method for predicting the gas content in the transformer oil based on the joint model when being processed by a processor.

Note that according to implementation requirements, each step/part described in the disclosure may be further divided into more steps/parts, or two or more steps/parts or partial operations of a step/part may be combined into a new step/part to accomplish the goal of the disclosure.

According to the above, the method provided by the disclosure may be accomplished in hardware and firmware, may be implemented as software or a computer code that may be stored in a recording medium (e.g., CD ROM, RAM, floppy disk, hard disk, or magneto-optical disk), or may be accomplished through a computer code originally stored in a remote recording medium or a non-transitory machine-readable medium through network downloading and to be stored in a local recording medium. In this way, the method described herein may be processed by software stored on a recording medium using a general-purpose computer, a dedicated processor, or programmable or dedicated hardware (e.g., ASIC or FPGA). It may be understood that a computer, a processor, a microprocessor controller, or programmable hardware includes a storage component (e.g., RAM, ROM, flash memory, etc.) that may store or receive software or a computer code. When the software or computer code is accessed and executed by a computer, a processor, or hardware, the processing method described herein is realized. In addition, when a general-purpose computer accesses the code for implementing the processing shown herein, execution of the code converts the general-purpose computer into a dedicated computer for executing the processing shown herein.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for controlling a transformer of a power grid by predicting a gas content in transformer oil of the transformer of the power grid based on a joint model stored in a memory, comprising:
    step 1 of obtaining, through an oil chromatography online monitoring device of the power grid, an original concentration time series of the gas content in the transformer oil of the transformer of the power grid of gas to be predicted related to a failure of transformer of the power grid;
    step 2 of performing, by a processor, empirical mode decomposition (EMD) on the original concentration time series based on the joint model stored in the memory to obtain a plurality of intrinsic mode function (IMF) components and 1 remaining component, and performing, by the processor, local mean decomposition (LMD) on the original concentration time series based on the joint model stored in the memory to obtain a plurality of product function (PF) components and 1 residual component;
    step 3 of applying, by the processor, a deep belief network (DBN) on each one of the IMF components and the remaining component and each one of the PF components and the residual component respectively based on the joint model stored in the memory to obtain a concentration prediction result of a next moment;
    step 4 of performing, by the processor, linear superposition and reconstruction on concentration prediction results of a same moment of each of the IMF components and the remaining component based on the joint model stored in the memory to obtain an EMD single-step prediction value, and performing, by the processor, the linear superposition and reconstruction on prediction results of a same moment of each of the PF components and the residual component based on the joint model stored in the memory to obtain an LMD single-step prediction value;
    step 5 of performing, by the processor, multi-step extended prediction on the EMD single-step prediction value and the LMD single-step prediction value based on the joint model stored in the memory to obtain a concentration prediction value of the original concentration time series of a plurality of subsequent moments of the gas content in the transformer oil of the transformer of the power grid; and
    step 6 of modifying, by the processor, an operation of the transformer of the power grid based on the concentration prediction value, wherein
    the operation is maintained in response to the concentration prediction value being smaller than a threshold value, and
    the operation is switched off to stop supplying power to the power grid through the transformer in response to the concentration prediction value not being smaller than a threshold value.

2. The method according to claim 1, wherein the step of performing the EMD on the original concentration time series to obtain the IMF components and 1 remaining component in step 2 comprises:
    step a of obtaining both all maximum points and all minimum points in the original concentration time series, obtaining an upper envelope of all of the maximum points and a lower envelope of all of the minimum points, obtaining an envelope mean value of the upper envelope and the lower envelope;
    step b of obtaining a difference value between the original concentration time series and the envelope mean value;
    step c of determining whether the difference value satisfies an IMF constraint condition, wherein the difference value is treated as a new input time series if no is determined, and step a and step b are performed until a finally obtained target difference value satisfies the IMF constraint condition, treating the target difference value as a first IMF component, separating the target difference value from the original concentration time series, obtaining a remaining component;
    step d of treating the remaining component as a new original concentration time series, repeatedly performing step a to step c, obtaining the rest of the IMF components and 1 final target remaining component.

3. The method according to claim 1, wherein the step of performing the LIVID on the original concentration time series to obtain the PF components and 1 residual component in step 2 comprises:
    step i of obtaining all local extremum points of the original concentration time series, sequentially calculating a mean value of adjacent local extremum points, obtaining a local mean function of the mean values;
    step ii of sequentially calculating an envelope estimate of adjacent local extremum points, sequentially smoothing adjacent 2 envelop estimated values to obtain an envelope estimation function;
    step iii of separating the local mean function from the original concentration time series to obtain a difference function;
    step iv of dividing the difference function by the envelope estimation function to obtain a division value function, treating the division function as the new input time series, repeatedly performing step i to step iii until a finally-obtained target division value function is 1 pure frequency modulation signal;

step v of multiplying all envelope estimation functions obtained in an iterative process to obtain an envelop signal;

step vi of multiplying the pure frequency modulation signal and the envelop signal to obtain a 1st PF component of the original concentration time series:

step vii of separating the 1st PF component from the original concentration time series to obtain a residual component, treating the residual component as the new original concentration time series, repeatedly performing step i to step vii until a finally-obtained target residual component is a monotonic function, obtaining the rest of the PF components and a final target residual component.

4. The method according to claim 2, wherein before step 3, the method further comprises:

normalizing each one of the IMF components and the remaining component and each one of the PF components and the residual component to a range of [0,1].

5. The method according to claim 4, wherein step 5 comprises:

step 5.1 of performing the multi-step extended prediction on the EMD single-step prediction value and the LMD single-step prediction value by using the trained deep belief network (DBN), performing the linear superposition and reconstruction on a multi-step prediction result of the EMD of a same moment to obtain an EMD-DBN multi-step prediction value, performing the linear superposition and reconstruction on a multi-step prediction result of the LMD of a same moment to obtain a LMD-DBN multi-step prediction value;

step 5.2 of obtaining and treating a mean value of the EMD-DBN multi-step prediction value and the LMD-DBN multi-step prediction value as the concentration prediction value of the original concentration time series of a plurality of subsequent moments.

6. The method according to claim 1, wherein the method further comprises:

evaluating the prediction result by using a root mean square error and an error standard deviation.

7. The method according to claim 1, wherein the gas to be predicted related to the failure comprises: hydrogen, methane, ethane, ethylene, or acetylene.

8. A system for controlling a transformer of a power grid by predicting a gas content in transformer oil of the transformer of the power grid based on a joint model stored in a memory, comprising a processor, wherein the processor is configured to:

obtaining, through an oil chromatography online monitoring device of the power grid, an original concentration time series of the gas content in the transformer oil of the transformer of the power grid of gas to be predicted related to a failure of the transformer of the power grid;

performing empirical mode decomposition (EMD) on the original concentration time series based on the joint model stored in the memory to obtain a plurality of intrinsic mode function (IMF) components and 1 remaining component, performing local mean decomposition (LMD) on the original concentration time series based on the joint model stored in the memory to obtain a plurality of product function (PF) components and 1 residual component;

applying a deep belief network (DBN) on each one of the IMF components and the remaining component and each one of the PF components and the residual component respectively based on the joint model stored in the memory to obtain a concentration prediction result of a next moment;

performing linear superposition and reconstruction on concentration prediction results of a same moment of each of the IMF components and the remaining component to obtain an EMD single-step prediction value, performing the linear superposition and reconstruction on prediction results of a same moment of each of the PF components and the residual component based on the joint model stored in the memory to obtain a LMD single-step prediction value;

performing multi-step extended prediction on the EMD single-step prediction value and the LMD single-step prediction value based on the joint model stored in the memory to obtain a concentration prediction value of the original concentration time series of a plurality of subsequent moments of the gas content in the transformer oil of the transformer of the power grid; and modifying an operation of the transformer of the power grid based on the concentration prediction value, wherein the operation is maintained in response to the concentration prediction value being smaller than a threshold value, and the operation is switched off to stop supplying power to the power grid through the transformer in response to the concentration prediction value not being smaller than a threshold value.

9. A non-transitory computer readable storage medium, storing a computer program, wherein the computer program implements the method for predicting the gas content in the transformer oil based on the joint model according to claim 1 when being processed by a processor.

10. The method according to claim 3, wherein before step 3, the method further comprises:

normalizing each one of the IMF components and the remaining component and each one of the PF components and the residual component to a range of [0,1].

11. The method according to claim 10, wherein step 5 comprises:

step 5.1 of performing the multi-step extended prediction on the EMD single-step prediction value and the LMD single-step prediction value by using the trained deep belief network (DBN), performing the linear superposition and reconstruction on a multi-step prediction result of the EMD of a same moment to obtain an EMD-DBN multi-step prediction value, performing the linear superposition and reconstruction on a multi-step prediction result of the LMD of a same moment to obtain a LMD-DBN multi-step prediction value;

step 5.2 of obtaining and treating a mean value of the EMD-DBN multi-step prediction value and the LMD-DBN multi-step prediction value as the concentration prediction value of the original concentration time series of a plurality of subsequent moments.

12. A non-transitory computer readable storage medium, storing a computer program, wherein the computer program implements the method for predicting the gas content in the transformer oil based on the joint model claim 2 when being processed by a processor.

13. A non-transitory computer readable storage medium, storing a computer program, wherein the computer program implements the method for predicting the gas content in the transformer oil based on the joint model claim 3 when being processed by a processor.

14. A non-transitory computer readable storage medium, storing a computer program, wherein the computer program implements the method for predicting the gas content in the transformer oil based on the joint model claim 4 when being processed by a processor.

15. A non-transitory computer readable storage medium, storing a computer program, wherein the computer program implements the method for predicting the gas content in the transformer oil based on the joint model claim 5 when being processed by a processor.

16. A non-transitory computer readable storage medium, storing a computer program, wherein the computer program implements the method for predicting the gas content in the transformer oil based on the joint model claim 6 when being processed by a processor.

17. A non-transitory computer readable storage medium, storing a computer program, wherein the computer program implements the method for predicting the gas content in the transformer oil based on the joint model claim 7 when being processed by a processor.

\* \* \* \* \*